United States Patent [19]
König

[11] Patent Number: 4,513,948
[45] Date of Patent: Apr. 30, 1985

[54] DIAPHRAGM REGULATING VALVE

[76] Inventor: Reinhard König, Altenbergstrasse 27, 7520 Bruchsal 7, Fed. Rep. of Germany

[21] Appl. No.: 339,757

[22] Filed: Jan. 15, 1982

[30] Foreign Application Priority Data

Jan. 14, 1981 [CH] Switzerland ............... 222/81

[51] Int. Cl.³ .............................................. F16K 3/03
[52] U.S. Cl. ........................................ 251/212; 251/251
[58] Field of Search ............................ 251/212, 251

[56] References Cited

U.S. PATENT DOCUMENTS

| 2,830,617 | 4/1958 | Brown | 251/212 X |
| 2,839,267 | 6/1958 | Sieradzki | 251/212 |
| 3,101,736 | 8/1963 | Egger | 251/212 X |
| 3,159,179 | 12/1964 | De Lain | 251/212 X |
| 3,329,396 | 7/1967 | Heaton et al. | 251/212 |

FOREIGN PATENT DOCUMENTS

| 501382 | 4/1954 | Canada | 251/212 |
| 369943 | 6/1963 | Switzerland . | |
| 579471 | 8/1946 | United Kingdom | 251/212 |

Primary Examiner—Arnold Rosenthal
Attorney, Agent, or Firm—Bernard, Rothwell & Brown

[57] ABSTRACT

A diaphragm regulating valve for the flow regulation of a fluid medium. The valve includes a housing having two halves defining a flow channel. A plurality of diaphragm elements in contact with one another are arranged for insertion into the flow channel to control fluid flow therethrough. An actuating mechanism is provided to move these diaphragm elements as desired. One or both of the housings have radial ribs forming a star in the flow channel and covering the contact edges of the diaphragm elements when the valve is closed.

16 Claims, 11 Drawing Figures

DIAPHRAGM REGULATING VALVE

BACKGROUND OF THE INVENTION

1. Field of the Invention

The invention relates generally to valves for regulating the flow of a fluid medium and particularly to improvements in diaphragm valves.

2. Discussion of Prior Art and the Invention

More specifically, the invention relates to a diaphragm regulating valve for regulation of the flow of a fluid medium, with a number of flat diaphragm elements in mutual contact and insertible into the flow channel mounted between two housing halves and actuatable by at least one catch ring also mounted in the housing.

Diaphragm regulating valves afford substantial advantages over traditional shutoff devices such as slide valves, cocks, lifting valves, throttle valves, and so forth. The continuously variable aperture cross-section of the diaphragm regulating valve is always positioned coaxial with the axis of the pipe, so that the flow in the valve is not deflected and experiences only slight losses of pressure. The medium need not change direction repeatedly, as is the case with lifting valves.

The rate of flow can be determined with precision in every closing position, the flow characteristic in theory exhibiting the shape of a parabola. The accuracy of the characteristic is affected chiefly by the rate of leakage between the segments of the diaphragm and by the nature of the medium which is to be regulated. The actual shape of the characteristic approaches the theoretical parabolic form in the case of semifluid media where the rate of leakage is correspondingly lower.

A diaphragm regulating slide valve is known from Swiss Pat. No. 369,943, one whose diaphragm elements can be introduced into a flow channel perpendicular to the wall of this channel. There are between the individual elements relatively large gaps which cannot be sealed off even in the closed position. The state-of-the-art slide valve thus exhibits a high leakage rate, so that it is not suited for precise flow regulation and thus cannot be employed in place of a conventional regulating valve.

The state-of-the-art regulating slide valve has a movable regulating ring sealed off toward the exterior and on the two plane surfaces. Lateral sealing is effected against the housing or against the movable diaphragm elements. When the pressure inside the system rises, the pressure per unit area on the seals also increases, thus resulting in an increase in the displacement force. Consequently, structural limits are imposed on the state-of-the-art slide valves from the viewpoint of rated pressure.

As a result, the slide valve is massive and material-intensive in point of design, thus rendering manufacture a costly process. Installation of the slide valve is also complicated and expensive. Because of the high rate of leakage, it is suited only for semifluid media such as sludge, paste, concrete, etc. It cannot be employed for highly fluid media, let alone gaseous ones, and thus affords no decisive advantages over the conventional regulating valves.

The object of the invention is to create a diaphragm regulating valve in which the disadvantages of the state-of-the-art regulating slide valve are avoided. It is claimed for the invention that this is achieved in such a way that at least one of the housing halves is provided with supporting ribs forming a star for the diaphragm elements, said ribs projecting into the flow channel, and so that the ribs fully cover the contact edges of the diaphragm elements when the valve is closed. It is expedient for the contact edges of adjacent diaphragm elements to be graduated to a reciprocally equal extent.

SUMMARY OF THE INVENTION

The diaphragm regulating valve is designed for regulation of the flow of a fluid medium. It has a number of flat diaphragm elements in mutual contact and insertible into a flow channel, which diaphragm elements are mounted in two housing halves. The diaphragm elements are set in movement by a catch ring also mounted in the housing. The contact edges of the diaphragm elements are recessed to a reciprocally equal extent. When the valve is in the closed state, the contact edges are completely covered by the ribs of a star mounted in the flow channel. This diaphragm regulating valve is characterized by a substanially lower leakage rate than the state-of-the-art diaphragm regulating valves.

DETAILED DESCRIPTION OF THE PREFERRED EMBODIMENTS

Figure 1:
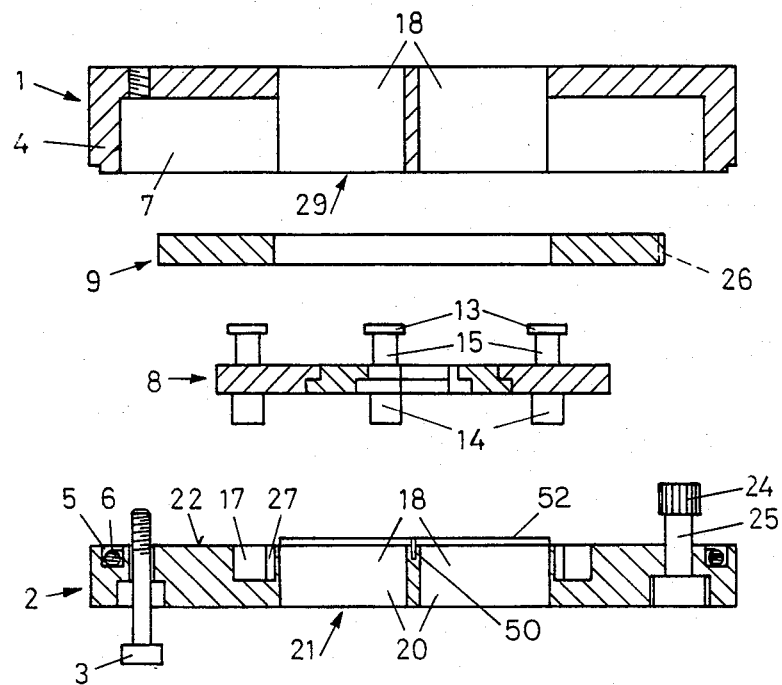
FIG. 1 shows a cross-section through the valve in an exploded view.
Figure 2:
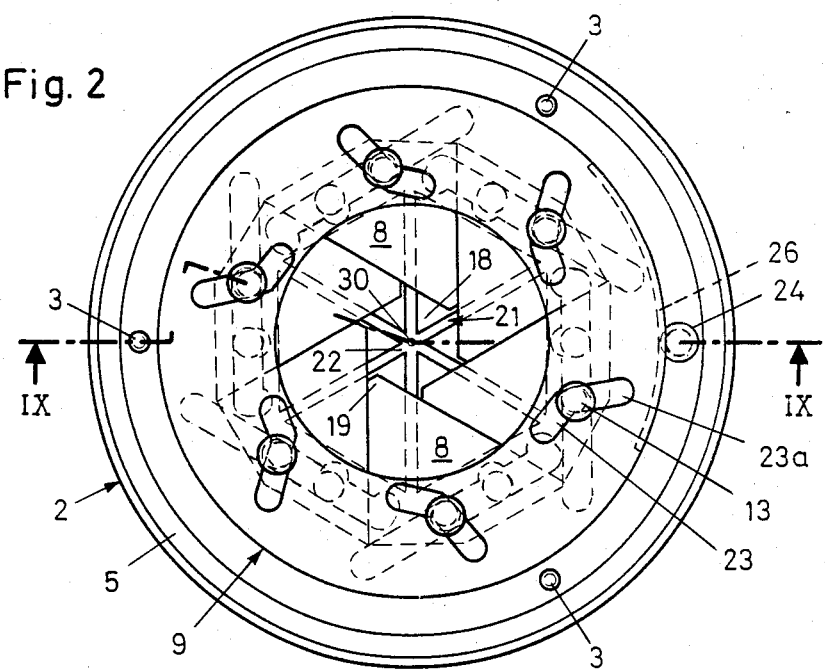
FIG. 2 shows a plan view of the valve with the top removed.
Figure 3:
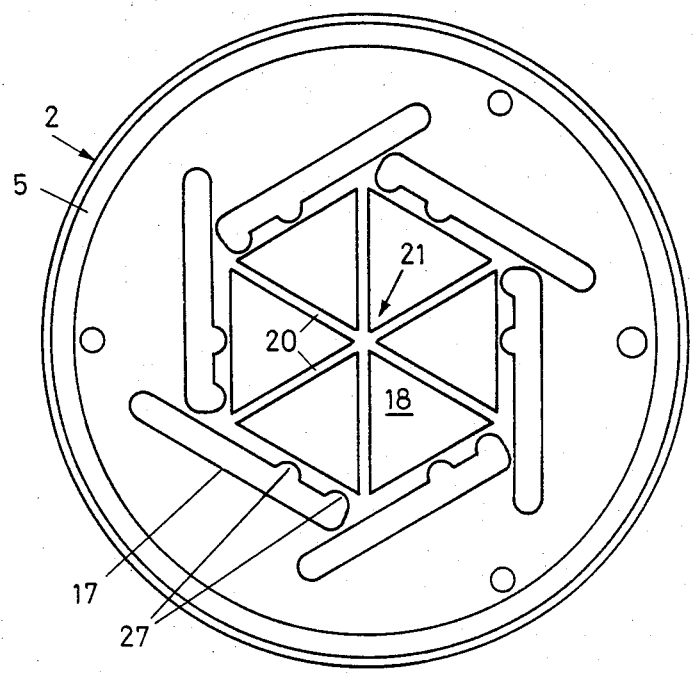
FIG. 3 shows a plan view of the bottom housing plate.

The diaphragm regulating valve shown in the figures has two housing plates 1, 2, which are pressed tightly against each other by means of screws 3. The downward projecting edge 4 of the upper (first) housing plate 1 extends into a corresponding annular groove 5 of the lower (second) housing plate 2 and compresses an O-ring 6 which is present in this groove 5. The upper housing plate 1 is provided with a cylindrical recess 7 in which six diaphragm elements 8 and a catch ring 9 are embedded.

Figure 4:
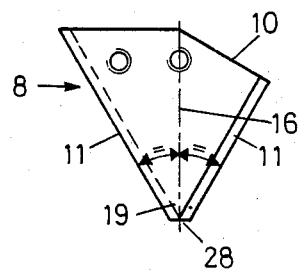
FIG. 4 shows a plan view of a diaphragm element.
Figure 5:
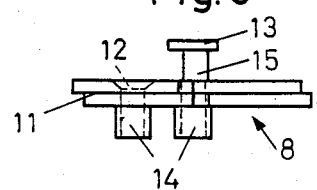
FIG. 5 shows a front view of the diaphragm element illustrated in FIG. 4.
Figure 6:
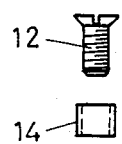
FIG. 6 shows a guide pin with guide sleeve.
Figure 7:
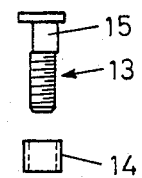
FIG. 7 shows a second guide pin with guide sleeve.
Figure 8:
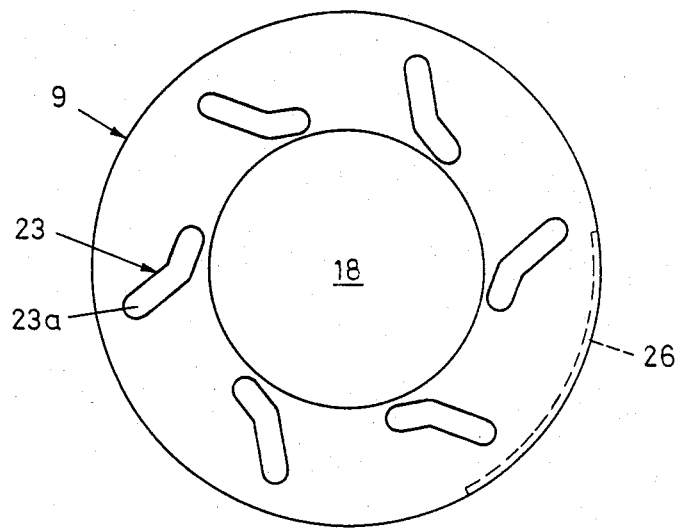
FIG. 8 shows a plan view of the catch ring.
Figure 9:
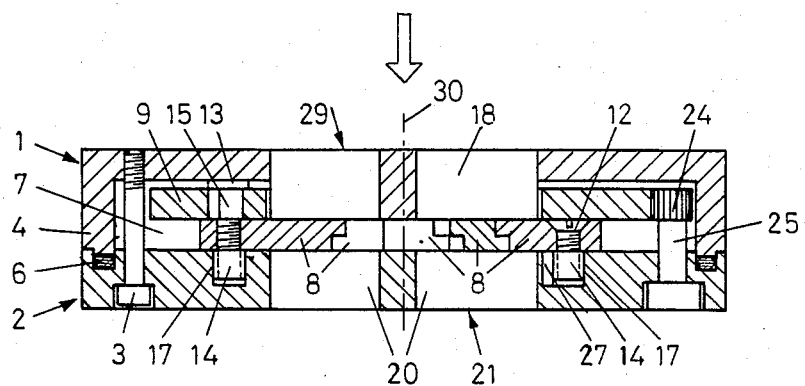
FIG. 9 shows a longitudinal section IX—IX through the diaphragm regulating valve as illustrated in FIG. 2.

As is to be seen from FIGS. 4 and 5, the diaphragm elements in essence have the shape of an equilateral triangle, one corner 10 of which, adjacent to edge 4, is beveled out of considerations of space. Every two adjacent diaphragm elements 8 are in contact along the arm edges 11 common to them, these arm edges 11 being complementarily recessed and assuming the function both of a guide and of a seal between the adjacent elements 8.

Each diaphragm element 8 has two guide pins 12, 13, onto the ends of each of which a downward projecting guide sleeve 14 is screwed.

One guide pin 13 is positioned on the angle bisector of the two stepped arms 11 and has an upper, camlike extension 15 which is mounted eccentrically relative to the axis of the pin 13. As will be explained in greater detail later, the precise position of the diaphragm elements relative to each other can be adjusted by means of the eccentric cam 15.

Six straight guide slots 17 forming an equilateral hexagon have been fashioned in the lower housing plate 2 to receive the diaphragm element 8. All guide slots 17 have the same radial spacing relative to the axis 30 of the discharge opening 18. An end of each of slots 17 is extended beyond of the pertinent corner of opening 18.

Each diaphragm element 8 is guided tangentially to the discharge opening 18 by the guide slots 17. In the closed position the tips 19 of the diaphragm elements 8 extend into the discharge opening 18, and the stepped arm edges 11 are covered by the ribs 20 of a star 21 which is a component of the lower housing plate 2 and also extends into the discharge opening 18.

The edges of the star facing the diaphragm elements 8 are flat and are situated in the same plane as the interior surface 22 of the plate. Together with the interior surface 22 of the plate the star forms a guide surface for the slide element 28. These elements are forced against this guide surface 22 by the pressure of the flow.

For the purpose of opening the valve the slide elements 8 are moved in concert in their slots 17, whereby a central, hexagonal flow cross-section is formed which is enlarged progressively until the diaphragm elements have reached their final position.

The diaphragm elements 8 are displaced by the catch ring 9 accommodated in the recess 7 in the upper housing plate 1.

The catch ring 9 has fashioned in it six oblique, bent guide slots 23 into which the cams 15 of the diaphragm element guide pins 13 extend. To rotate the catch ring 9 use is made of a pinion 24 whose shaft 25 penetrates the lower housing plate 2. The pinion 24 meshes with a gear-ring segment 26 on the external circumference of the catch ring 9.

The mutual position of the diaphragm elements 8 can be set and adjusted with the precision by rotating the eccentric cams 15. When the valve is in the open position, the cams 15 are in section 23a of the guide slot 23. If the catch ring 9 is now rotated to close the valve, the diaphragm elements 8 are displaced into the discharge opening of the flowing medium until the opening is more or less closed off.

With the diaphragm elements 8 in this position, the cams 15 are in the area of the bend in the guide slot 23 and the guide sleeves 14 in the area of radial extensions 27 of the guide slots 17 of housing plate 2. If the catch ring 9 is now rotated further, the cams 15 reach the sections of guide slot 23 designated as 23a, whereby the diaphragm elements are subjected to an increased radial force component.

The guide sleeves 14 enter the radial extensions 27 of the slot 17, so that the diaphragm elements radially lock relative to each other, in order that a high sealing effect can be achieved. It is expedient for the tips 19 of the diaphragm elements to be blunt ended, as is shown in FIG. 4 below number 28. The closing edges 11 and the blunt ended tips 28 are completely covered by the guide star 21, 29.

The upper housing plate 1 as well may be provided with a guide star 29, so that the diaphragm elements 8 are guided between the two starts inside the discharge opening 18. In order to achieve a heightened clamping effect in the closed position, the diaphragm elements could be sloped at the top in the form of a wedge.

Means other than the wedge-shaped or tapering surfaces could also be employed to produce locking, ones such as oblique ribs on the diaphragm elements which are engaged with the ribs of the star shortly prior to complete closing of the valve.

In other embodiments grooves 50 could be recessed into the ribs 20 of the stars, into which grooves sealing strips 52 are introduced which are pressed against the contact edges 11 of the diaphragm elements 8 when the valve is closed, as shown in FIG. 1.

The diaphragm elements can assume various shapes, for example, four rectangular elements or a multiplicity of crescent-shaped elements. In this case the ribs of the stars as well would have to assume the corresponding shapes.

It is essential for the segments always to be guided through 90° relative to the angle bisector of the segment tip with the valve in the closed position.

The diaphragm regulating valve described in the foregoing affords the following advantages:

By means of apporiate arrangement of the pin guide in the adjusting ring, the movement of the segments with the valve in the closed position is modified in such a way that the segments undergo a central movement to the center. This results in pressure on the sides which improves the reciprocal sealing of the elements.

As a result of inclination of the segments and corresponding surfaces of the guide star in the upper portion, pressure is generated between the two guide stars in the last phase of closing, when the segments are in radial movement; that is, the segments are pressed against the projecting surfaces and are sealed.

In every position except the closed position the diaphragm elements fit together loosely and are guided loosely by the graduated arm edges. Frictional forces are very slight.

Guiding of the adjusting ring is provided by means of the recess in the upper part of the housing. The adjusting ring is actuated in a very simple manner by way of the gear-ring and the pinion. The shaft of the pinion extending to the exterior can be sealed by means of a retaining ring. This shaft can be connected to a drive of any nature, such as a motor or manual drive.

The diaphragm regulating valve which has been described causes no noise, since its design is decidedly such as to facilitate flow. In comparison to conventional valves, higher flow rates can be accommodated at the same noise level.

As was stated at the outset, in the case of conventional valves the displacement force works entirely against the pressure of the system. The displacement force must consequently always be higher than the pressure of the system. Depending on the application, resort is had to pressure equalization devices in the case of conventional valves, but this entails a higher production expense and higher costs. With the diaphragm regulating valve here proposed the displacement force no longer works against the pressure of the system; it rather utilizes this pressure to improve the sealing effect. The displacement force represents a mere fraction of the pressure of the system. High flow rates can thus be regulated accurately with a minimal displacement force.

The adjusting drives can be designed so as to be smaller and largely independent of the flow rate. As a result, any drive system can be employed and a higher degree of accuracy can be achieved in regulation.

The $Kv_R$ value indicates the smallest flow rate which can be regulated and is measured as a percentage of the maximum flow rate. The $Kv_R$ value ranges from 5 to 10% for conventional valves. With the valve claimed for the invention the $Kv_R$ value is much lower, coming very near 0%.

The diaphragm regulating valve is very simple in design and is characterized by very small dimensions, so that it may also be installed in pipelines at a later period with the prospect of it not generating future problems. The sealing is comparable to that achieved with conventional lifting valves, so that the latter may readily be replaced by the valve claimed for the invention. Owing to its very slight thickness, it is very simple, for example to insert it between two flanges of a pipeline, in which case the drive between the flanges must be extended to the exterior. This structural embodiment should be clear to the specialist and requires no further explanation.

Figure 11:
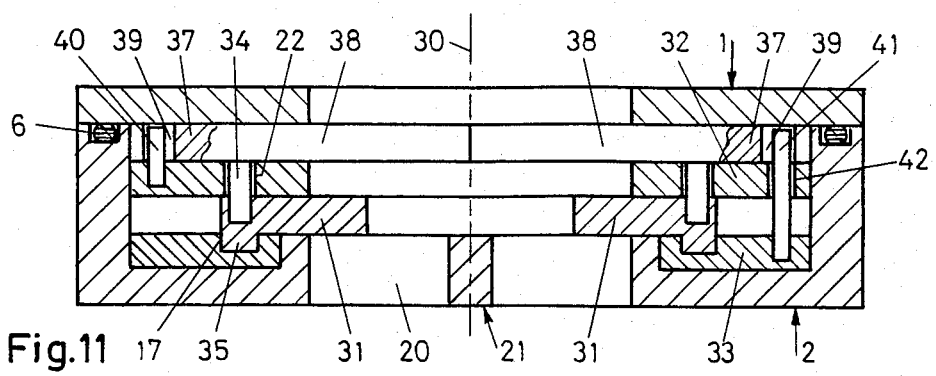
FIG. 11 shows cross-section through the valve illustrated in FIG. 10.
Figure 10:
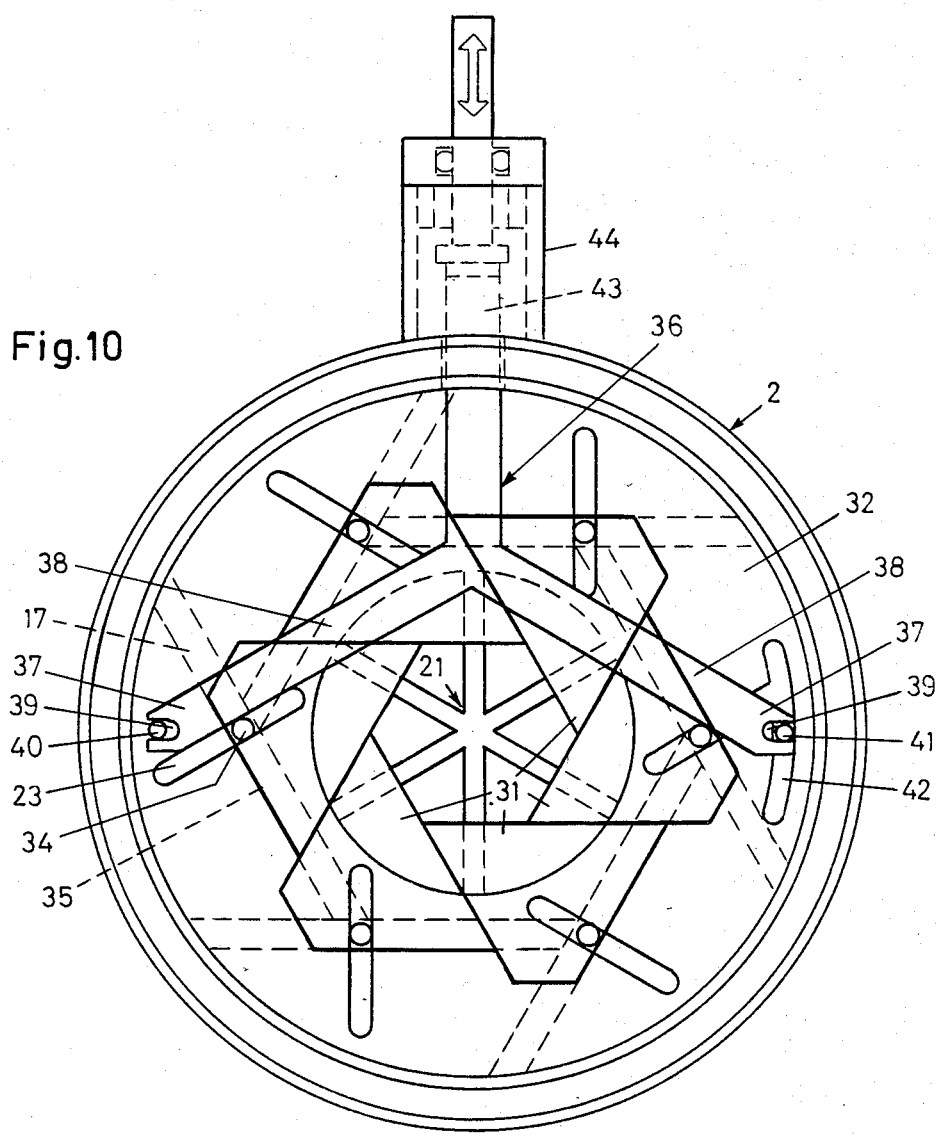
FIG. 10 shows a plan view of another form of embodiment of a diaphragm regulating valve.

In the case of the embodiment of the diaphragm regulating valve shown in FIGS. 10 and 11, the diaphragm segments 31 are mounted between two catch rings 32, 33, which are mounted rotatably inside a twin-shell housing 1, 2. The straight guide slots 17 are in this case not provided in the lower housing plate 2, as in the embodiment example discussed above, but in the lower catch ring 33, while guide slots 23 are in the upper catch ring 32. Each diaphragm segment 31 has at the top upper catch ring connecting means in the form of a guide pin 34 which extends into one of the guide slots 23 of the upper catch ring 32. At the bottom, the diaphragm segment 31 is provided with lower catch ring connecting means in the form of an elongated, beam-shaped projection 35 which extends into one of the guide slots 17 of the lower catch ring 33.

For the purpose of actuation of the valve a Y-shaped control lever 36 is provided, the two arms 38 or fork of which is acommodated inside the housing 1, 2. The ends 37 of the arms have small milled recesses 39 into each of which an acutating pin 40, 41 extends. One pin 40 is anchored in the upper catch ring, while the other 41 is fastened in the lower catch ring 33 and extends through an arcuate recess 42 in the upper catch ring 32.

The handle 43 of the control lever 36 extends to the exterior through a connecting sleeve 44, the connecting sleeve being mounted perpendicular to the axis of the housing. The valve is closed and opened by moving this handle 43 back and forth. The two arm ends 37, which are positioned diametrically opposite each other, effect simultaneous rotation of the two catch rings 32, 33 by way of pins 40, 41, one catch ring being rotated clockwise and the other counterclockwise, an equal distance in opposite directions. This in turn effects displacement of the diaphragm segments, in a manner similar to that already described in the first embodiment example.

The drive can be very simple in design with this embodiment of the diaphragm valve. The motive power is directed toward the center and the control movement path traveled by the lever 43 is short, since motion is transmitted to both catch rings simultaneously. A short, simple closing movement is thereby ensured, and manufacture of the valve entails a relatively small design effort.

The surfaces of the star and the corresponding surfaces of the blades can be ground in order to achieve a good sealing. The sealing effect is intensified by the differential pressure present when the valve is closed.

I claim:

1. A diaphragm regulating valve for regulation of the flow of a fluid medium comprising: a plurality of flat diaphragm elements having contact edges in mutual contact; a housing, including two housing halves, defining a flow channel; said diaphragm elements arranged for insertion into said flow channel, and actuatable by at least one catch ring also mounted in the housing; at least one of the housing halves being provided with supporting ribs projecting into said flow channel and forming a star having a shape generally defined by the contact edges of said elements in said flow channel when the valve is closed, and said ribs fully covering the contact edges of said diaphragm elements in said flow channel when the valve is closed, the diaphragm being forced against the supporting ribs by fluid pressure.

2. The diaphragm regulating valve according to claim 1, wherein the other housing half is also provided with a star covering the edges when the valve is in the closed state, and the diaphragm elements are guided between the two stars.

3. The diaphragm regulating valve according to claim 2, wherein at least one of said diaphragm elements and said ribs have means for effecting locking of said diaphragm elements with the stars when said diaphragm elements are introduced into the channel.

4. The diaphragm regulating valve according to claim 3, wherein said means for effecting locking of said diaphragm elements include said ribs of said star being wedge shaped and coordinated with said diaphragm elements being correspondingly beveled.

5. The diaphragm regulating valve according to claim 1, wherein said diaphragm elements include guide pins, grooves are provided in one housing half to guide said diaphragm elements provided with said guide pins and said grooves define radial extensions into which said guide pins can be forced immediately prior to complete closing of the valve.

6. The diaphragm regulating valve according to claim 1, wherein guide slots are recessed into said catch ring, said diaphragm elements define pilots for projecting into said guide slots said guide slots have a component into which the pilots can be forced immediately prior to full closing of the valve, said component configured for exerting on said pilot radially oriented force when the valve is in the closed position.

7. The diaphragm regulating valve according to claim 6, wherein the pilot is designed as a rotatable, eccentric adjusting cam.

8. The diaphragm regulating valve according to claim 1, wherein said catch ring is mounted rotatably in a recess in a housing half and has a gear-ring segment into which meshes a driving pinion whose shaft extends through the housing to the exterior.

9. The diaphragm regulating valve according to claim 1, wherein said ribs are provided with sealing strips for sealing off the contact edges when the valve is closed.

10. The diaphragm regulating valve according to claim 1, wherein said contact edges of adjacent diaphragm elements are complementarily recessed.

11. The diaphragm regulating valve according to claim 1, wherein the diaphragm elements are mounted between two catch rings which can be rotated an equal distance in opposite directions by means of an actuating lever and said diaphragm elements have on each side catch ring connecting means which project into associated guide grooves in said catch rings.

12. The diaphragm regulating valve according to claim 11, wherein said actuating lever is mounted for movement back and forth perpendicular to the axis of said housing and has in the interior of said housing two arms whose ends act on both of said catch rings.

13. The diaphragm regulating valve according to claim 12, wherein there is anchored in each of said catch rings a pin which projects into a recess in the associated end of said arm.

14. A diaphragm regulating valve according to claim 13, wherein one of said pins of the said catch rings more distant from said actuating lever extends through an arched recess in the other catch ring.

15. The diaphragm regulating valve according to claim 12, wherein said two arm ends are in diametrically opposite positions.

16. The diaphragm regulating valve according to claim 11, wherein a handle of the actuating lever extends into a connector socket positioned perpendicular to the axis of said housing and is sealed in said socket so as to be capable of being moved back and forth.

* * * * *